United States Patent
Claerhout (10) Patent No.: US 7,435,373 B2
(45) Date of Patent: Oct. 14, 2008

(54) APPARATUS AND METHOD FOR THERMAL DE-BURRING OF SLOTTED WELL LINERS

(75) Inventor: Mike Claerhout, Nisku (CA)

(73) Assignee: Regent Technologies Ltd., Nisku (CA)

( * ) Notice: Subject to any disclaimer, the term of this patent is extended or adjusted under 35 U.S.C. 154(b) by 455 days.

(21) Appl. No.: 10/553,693

(22) PCT Filed: Apr. 22, 2004

(86) PCT No.: PCT/CA2004/000599

§ 371 (c)(1),
(2), (4) Date: Oct. 18, 2005

(87) PCT Pub. No.: WO2004/096476

PCT Pub. Date: Nov. 11, 2004

(65) Prior Publication Data

US 2007/0001351 A1    Jan. 4, 2007

(30) Foreign Application Priority Data

Apr. 25, 2003    (CA) .................................... 2426874

(51) Int. Cl.
*B23K 7/06*    (2006.01)
(52) U.S. Cl. ............................ 266/51; 266/55; 148/201; 148/202
(58) Field of Classification Search ................. 266/55, 266/51; 148/201, 202
See application file for complete search history.

(56) References Cited

U.S. PATENT DOCUMENTS

| 4,035,604 A | 7/1977 | Meleka et al. |
| 4,340,163 A | 7/1982 | Romashov et al. |
| 4,600,180 A * | 7/1986 | Abbey, III .................... 266/51 |

FOREIGN PATENT DOCUMENTS

JP        356099016 A  *  8/1981

OTHER PUBLICATIONS

"Thermal Energy Deburring" Article from internet website: claymore.engineer.gvsu.edu/~rutgersj/reas.html, printed Nov. 25, 2002, 2 pages.

* cited by examiner

*Primary Examiner*—Scott Kastler
(74) *Attorney, Agent, or Firm*—Donald V. Tomkins (57) ABSTRACT

A method and apparatus for removing burrs from inside slotted metal liners exposes the burrs to a high-intensity gas flame that effectively oxidizes or incinerates the burrs, without inducing undesirable temperature levels in the parent metal of the slotted liner. This is accomplished using a torch head assembly having multiple gas torch nozzles disposed radially around the circumferential perimeter of the torch head, such that when the torch head is passed through the interior of a slotted liner, the flames are directed toward the interior surface of the liner. Auxiliary oxygen is introduced at the nozzle outlets, resulting in a large increase in flame velocity and intensity and, in turn, an increase in the flame temperature. The auxiliary oxygen may be introduced through annular passages surrounding the nozzles, such that the auxiliary oxygen effectively forms a cylindrical curtain surrounding the flame at each nozzle.

38 Claims, 7 Drawing Sheets

APPARATUS AND METHOD FOR THERMAL DE-BURRING OF SLOTTED WELL LINERS

FIELD OF THE INVENTION

The present invention relates to apparatus and methods for removing burrs from internal surfaces of tubular goods, and in particular for removing burrs from internal surfaces of slotted. pipe used as liners in oil and gas wells.

BACKGROUND OF THE INVENTION

In the production of oil or gas from an subsurface formation, steel liner pipes with multiple longitudinal slots ("slotted liners") are commonly installed in both vertical and horizontal wells to allow oil or gas present in the formation to enter the wells, whereupon the oil or gas can then be pumped or otherwise lifted to the surface for processing. The slots must be narrow enough to prevent significant amounts of formation materials from entering and clogging up the well and associated equipment such as pumps. For wells installed in formations containing fine-grained materials, liner slot width may need to be as narrow as 0.04 inches (1.0 millimeter) or even considerably less. The slots must be long enough and numerous enough to allow for effective flow into the liner, without reducing the liner's structural strength below safe levels. The liner's structural strength (especially its flexural strength) is particularly important for horizontal wells, in which the liner must retain sufficient strength to be bent through transition sections between vertical and horizontal wellbores without fracture or excessive plastic deformation.

The slots may be of any convenient length, but they are typically in the range of 3 to 4 inches (75 to 100 millimeters) long. They are usually arrayed at uniform spacing about the circumference of the pipe, at radial intervals as low as 5 degrees. They are commonly cut into the liner sidewall using narrow circular slitting blades. One known method uses a "gang mill" fitted with multiple slitting blades radially oriented on planes passing through the longitudinal axis of the liner. As the liner is moved longitudinally relative to the gang mill, the blades are deployed so as to cut slots of desired length through the liner sidewall.

Rather than making perfectly clean cuts, the slitting blades tend to leave jagged burrs or tendril-like "wickers" where the slots intercept the interior surface of the liner. These burrs and wickers are undesirable for a variety of reasons, so the production of slotted liners typically includes steps to remove them, but known methods of doing so are not entirely satisfactory. One common method is to run a device commonly called a "stinger" through the slotted liner. The stinger has multiple rotating blades disposed such that they will essentially scrape the interior perimeter of the liner as the stinger passes through. The intent is that the rotating blades will cut off the wickers, which can then be removed from the liner by compressed air or other means.

However, this method has proved to be only partially effective, because the scraping blades tend to bend the burrs and wickers and push them back across or into the slots, causing a direct reduction in the open slot area available for passage of oil into the liner. This problem is particularly evident for slot widths of 0.04 inches (1 mm) and less. The effective slot area tends to become further reduced when the liner is placed in service, because foreign materials entering the slots build up on the bent-back wickers, causing the slots to become partially or totally plugged.

Other mechanical methods, such as honing or burnishing, have been used in an attempt to polish the wickers down. However, these methods have similar drawbacks, in that they tend to simply brush some or all of the wicker metal back into the slots.

When using known de-burring methods having such significant drawbacks, it may be necessary to allow for slot plugging by providing a greater amount of slotting than might otherwise be required. It has been observed that slot plugging can reduce the effective permeability of a slotted liner by as much as 40% to 60%, so in order to obtain a desired permeability, liners may have to have a slotted area up to or more than twice as large as the area theoretically required for a given application. Such extra slotting obviously increases liner fabrication cost. It also decreases the structural strength of the liner, possibly entailing the use of liners with greater wall thickness, thus increasing the total cost of the slotted liner even further.

In addition to the foregoing problems, wickers or any other material left inside slotted liners can damage or interfere with expensive down-hole tools used in well-servicing operations.

A possible alternative approach to wicker and burr removal would be thermal de-burring; i.e., exposing the wickers and burrs to a high-temperature flame. It is well known that burrs of steel or other materials can be burned off and effectively incinerated if subjected to a sufficiently hot flame. This would facilitate very effective removal of burrs from a slotted liner, as it would be fairly simple to remove the residue from the process (i.e., oxides) using compressed air, high-pressure water blasting, or other conventional means.

For the type of steel commonly used for slotted liners, effective use of this method would require heating the burrs to temperatures in the range of 6000° F. (3316° C.). At the same time, though, care would have to be taken to ensure that the temperature of the main body of the liner does not become excessive, in order to prevent undesirable metallurgical changes in the parent metal. This would not be overly difficult if the high-temperature flame could be effectively focused or concentrated on the burrs and not on the main body of the liner, because the much larger mass of the liner (i.e., compared to the mass of the burrs) would allow efficient dissipation of the heat applied to the burrs through conduction, without excessive temperature build-up in the parent material. However, it is virtually impossible to direct a flame toward burrs inside a steel liner without exposing the main body of the liner to the flame. Furthermore, the inventor has observed that when conventional flame sources such as acetylene torches are used in an attempt to heat burrs inside a slotted liner to temperatures sufficient to achieve vaporization, the flame must dwell upon the burrs for so long that excessive localized heating of the parent metal is unavoidable. The prior art appears to disclose no solution to this problem.

For the foregoing reasons, there is a need for wicker-removal and de-burring apparatus and methods that can remove burrs and wickers from slotted metal liners with substantially greater effectiveness than known apparatus and methods. In particular, there is a need for such apparatus and methods that can remove burrs and wickers by exposure to an oxidizing flame, without raising the temperature of the adjacent parent metal so high as to cause metallurgical changes or other undesirable effects. The present invention is directed to these needs.

BRIEF SUMMARY OF THE INVENTION

In general terms, the present invention is a method and apparatus whereby burrs inside a slotted metal liner may be exposed to a gas flame hot enough as to effectively oxidize or incinerate the burrs, without inducing undesirable temperature levels in the parent material. This is accomplished by providing a torch head having multiple gas torch nozzles disposed around the circumferential perimeter of the torch head, such that when the torch head is passed through a slotted liner, the flames are directed toward the interior surface of the liner. The apparatus is adapted to deliver a substantially stoichiometrically-balanced fuel mixture (i.e., a combustion gas and an oxidizing gas) to the nozzles, so as to produce substantially neutral-burning flames at the nozzles. It has been determined, through testing, that the temperature of a neutral-burning flame will increase considerably in the presence of oxygen. In accordance with the present invention, therefore, provision is made for introducing an auxiliary oxidizing gas—preferably pure oxygen—near the nozzle outlets, thus increasing the flame velocity and intensity, and in turn causing a significant increase in flame temperature.

The temperature of the torch flames produced according to the present invention is thus considerably higher than it would be without the introduction of auxiliary oxidizing gas. It has been found that when the torch head, having a suitable number of nozzles and having auxiliary oxidizing gas introduced around the torch flames, is passed through a slotted liner at an appropriate rate of travel, the flame intensity is sufficient to incinerate a high percentage of burrs and wickers from the liner, without excessive temperature rise in the parent metal. The appropriate torch head travel speed will depend on a variety of factors, including liner diameter and wall thickness, feed pressures of the fuel mixture components and the auxiliary oxygen, the number of nozzles on the torch head, and the distance from the nozzle outlets to the inner surface of the liner.

Accordingly, in one aspect the present invention is a de-burring apparatus, for removing burrs from interior surfaces of a slotted metal liner, said apparatus comprising:

(a) a torch carrier body having a front end and a rear end;
(b) a torch head connected to the torch carrier body at the front end thereof, said torch head having a longitudinal axis and a circumferential lateral surface, said torch head having formed therewithin:
  b.1 a fuel plenum, for receiving a fuel mixture comprising a combustion gas and a primary oxidizing gas;
  b.2 an auxiliary plenum, for receiving and conveying an auxiliary oxidizing gas from a source of auxiliary oxidizing gas;
  b.3 a plurality of fuel channels, each fuel channel having an outer end and an inner end, and each fuel channel at its inner end being in fluid communication with the fuel plenum; and
  b.4 a plurality of nozzle ports, each nozzle port extending inward from the circumferential lateral surface of the torch head and having an inner wall surface, and each nozzle port being in fluid communication with a corresponding one of the fuel channels; and
(c) a plurality of torch nozzles, each nozzle having an outer end, an inner end, and a side surface, an inner end, and each nozzle having a fuel passage extending through the nozzle between said inner and outer ends;

said apparatus being characterized by:
(d) each nozzle being retainingly installed within a corresponding nozzle port and defining an interstitial space between the side surface of the nozzle and the inner wall surface of the nozzle port, said interstitial space having an outer end in proximity to the outer end of the nozzle;
(e) the outer end of each nozzle extending close to or beyond the circumferential surface of the torch head;
(f) the inner end of each nozzle being sealingly engaged with the fuel channel associated with the corresponding nozzle port, such that the outer end of the fuel passage of each nozzle is in fluid communication with the fuel plenum; and
(g) each interstitial space being in fluid communication with the auxiliary plenum, and intercepting the circumferential surface of the torch head, such that auxiliary oxidizing gas can flow from the auxiliary plenum into the interstitial spaces and exit at the outer end thereof.

In another aspect, the invention is a method of removing burrs from interior surfaces of a slotted metal liner, said method comprising the steps of:

(a) introducing a fuel mixture comprising a combustion gas and a primary oxidizing gas into the fuel plenum of the torch head of a de-burring apparatus substantially as described immediately above, such that the fuel mixture flows into the fuel passages of the torch nozzles of the torch head;
(b) igniting the fuel mixture exiting the fuel passages of the torch nozzles to create torch flames;
(c) introducing an auxiliary oxidizing gas into the auxiliary plenum of the torch head, such that the auxiliary oxidizing gas flows out of the interstitial spaces around the torch nozzles;
(d) regulating the respective flowing pressures of the fuel mixture and auxiliary oxidizing gas so that the torch flames are of a temperature sufficient to substantially incinerate metal burrs present on the interior surface of the slotted liner; and
(e) passing the torch head through the slotted liner at an appropriate speed such that the torch flames are directed toward the interior surface of the slotted liner so as to substantially incinerate the metal burrs.

In a further aspect, the invention is a method of removing burrs from interior surfaces of a slotted metal liner, said method comprising the steps of:

(a) providing a torch head having one or more torch nozzles;
(b) delivering a fuel mixture comprising a combustion gas and a primary oxidizing gas to the one or more torch nozzles;
(c) igniting the fuel mixture exiting the one or more torch nozzles, thus creating one or more torch flames;
(d) introducing an auxiliary oxidizing gas in the immediate vicinity of each torch flame so as to raise the flame temperature to a level sufficient to substantially incinerate metal burrs present on the interior surface of the slotted liner; and
(e) passing the torch head through the slotted liner at an appropriate speed such that the torch flames are directed toward the interior surface of the slotted liner so as to substantially incinerate the metal burrs.

BRIEF DESCRIPTION OF THE DRAWINGS

Embodiments of the invention will now be described with reference to the accompanying figures, in which numerical references denote like parts, and in which:

FIG. 4b is a cross-sectional perspective view of the torch head, flame shield, and centralizer means illustrated in FIG. 4a.

DETAILED DESCRIPTION OF THE PREFERRED EMBODIMENT

Figure 1:
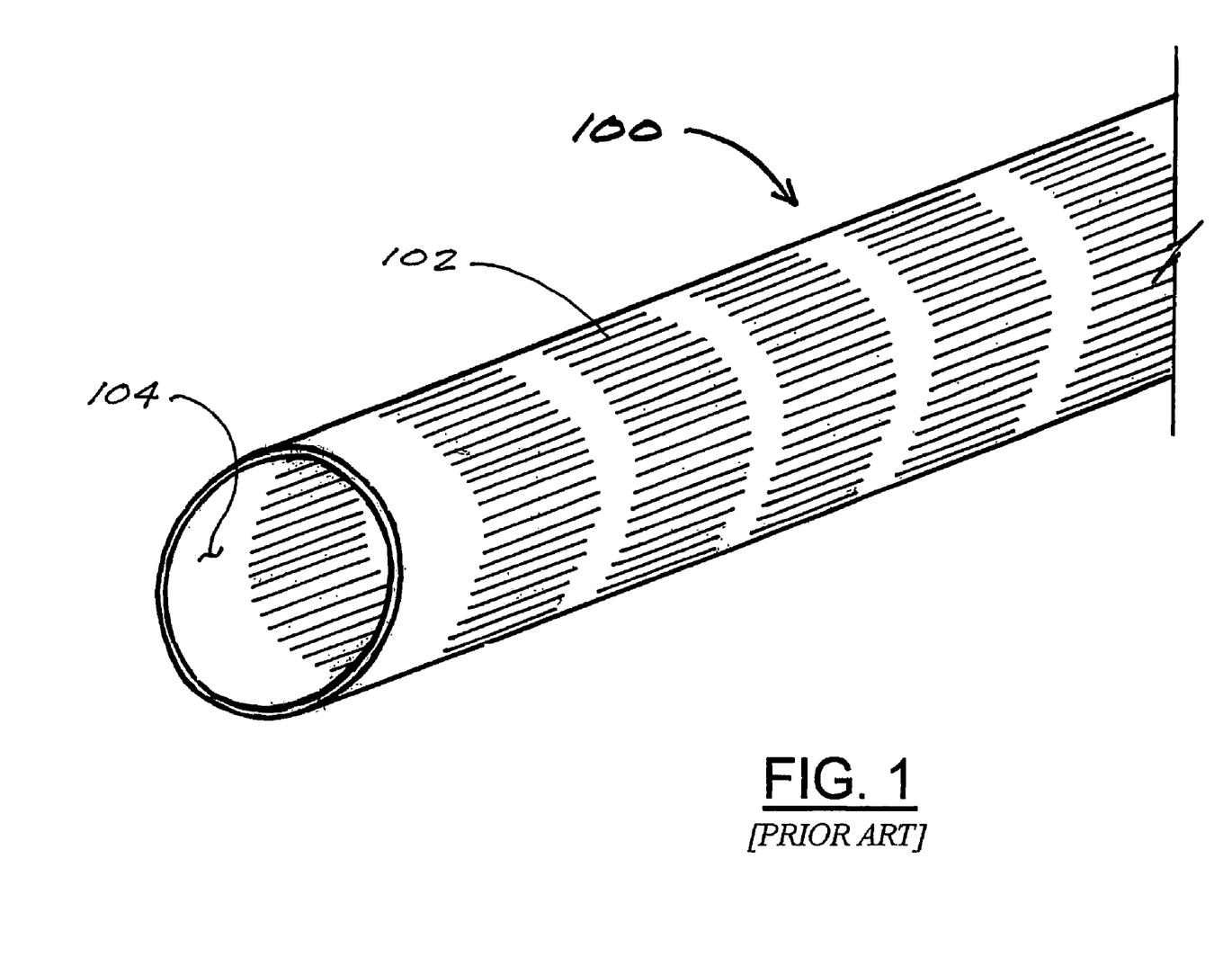
FIG. 1 is a perspective view of a typical slotted liner for use in oil or gas wells.
Figure 2:
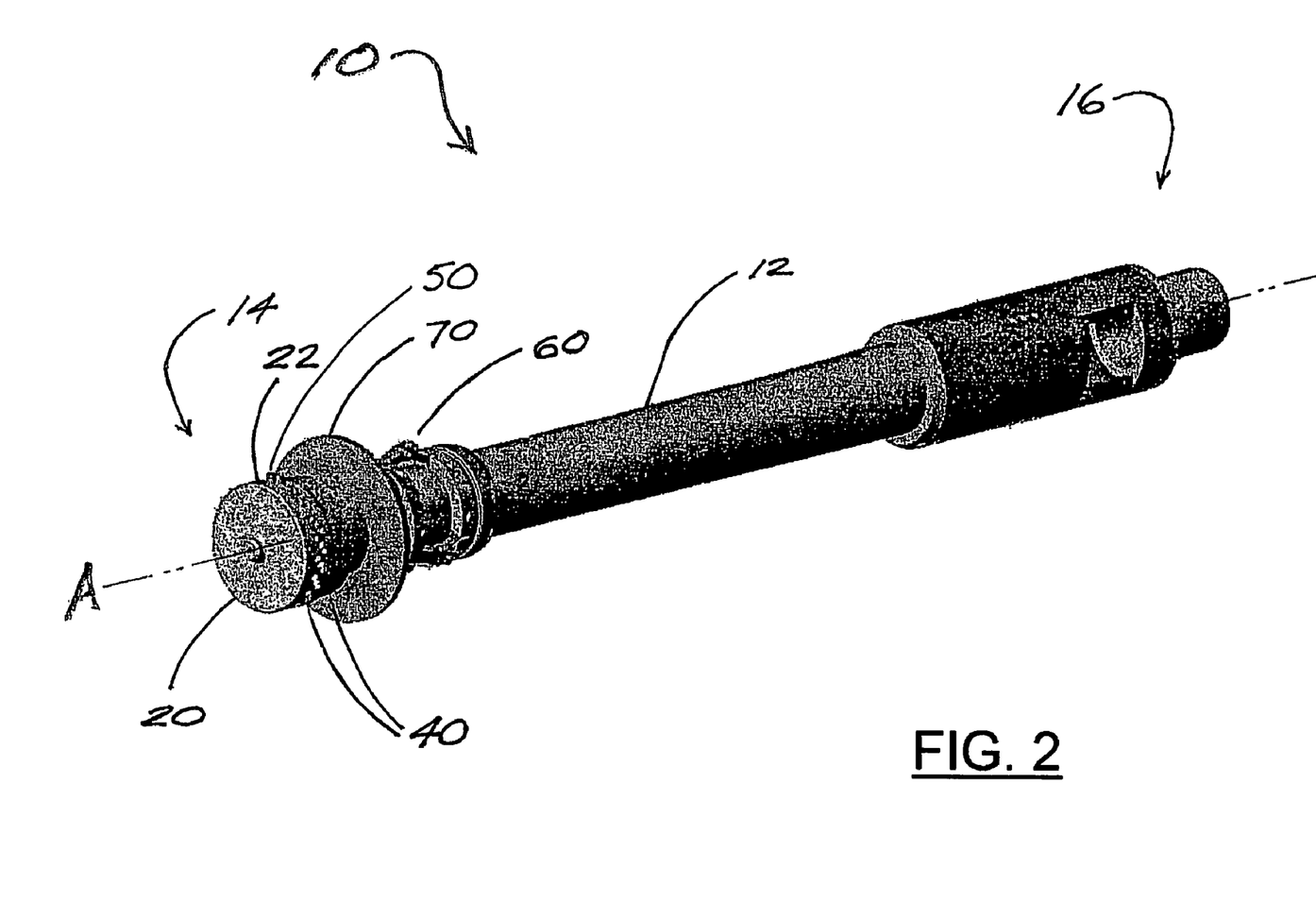
FIG. 2 is a perspective view of the torch head and torch carrier body of a first embodiment of the apparatus.

FIG. 1 illustrates a slotted liner 100 of the general type that may be de-burred using the present invention may be used. The slots 102 in the slotted liner 100 shown in FIG. 1 are oriented parallel to the longitudinal axis of the liner 100, but in other variations of slotted liner 100 the slots 102 may be oriented transversely or obliquely relative to the axis of the liner 100. However, the functioning of the present invention is not dependent upon or affected in any substantial way by the orientation of the slots 102 in the liner 100 being de-burred.

As illustrated in the Figures, the de-burring apparatus 10 of the present invention includes a torch carrier body 12 having a front end 14 and a rear end 16. The torch carrier body 12 is adapted to accommodate conduits 18a, 18b, and 18c for conveying, respectively, a combustion gas, a primary oxidizing gas, and an auxiliary oxidizing gas from respective sources. Where the same type of gas is used for both the primary and auxiliary oxidizing gases, a common source may be used. A torch head 20, having a longitudinal axis A and a circumferential lateral surface 22, is connected to the torch carrier body 12 at the front end 14 thereof. The torch head 20 has multiple gas torch nozzles 50 disposed (preferably, but not necessarily, at uniform spacing) around the circumferential lateral surface 22 of the torch head 20, such that when the torch head 20 is passed through the interior of a slotted liner 100, flames from the torch nozzles 50 will be directed toward the interior surface of the liner 100 and, therefore, toward any burrs or wickers that may be present in the vicinity of the slots 102 in the liner 100.

Figure 5:
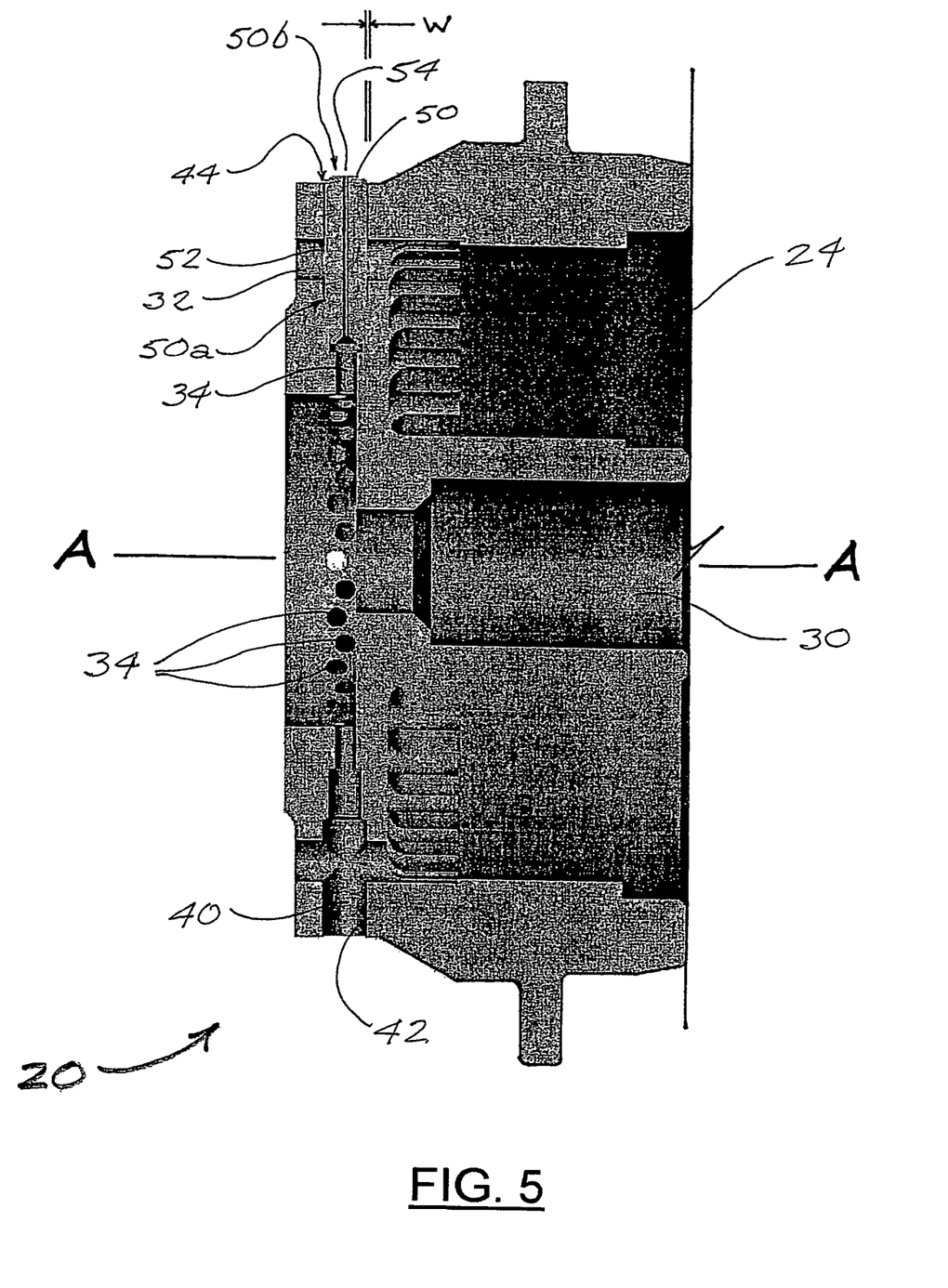
FIG. 5 is a cross-sectional view of the torch head of an embodiment of the invention in which the torch nozzles are oriented substantially perpendicularly relative to the axis of the torch head.
Figure 6:
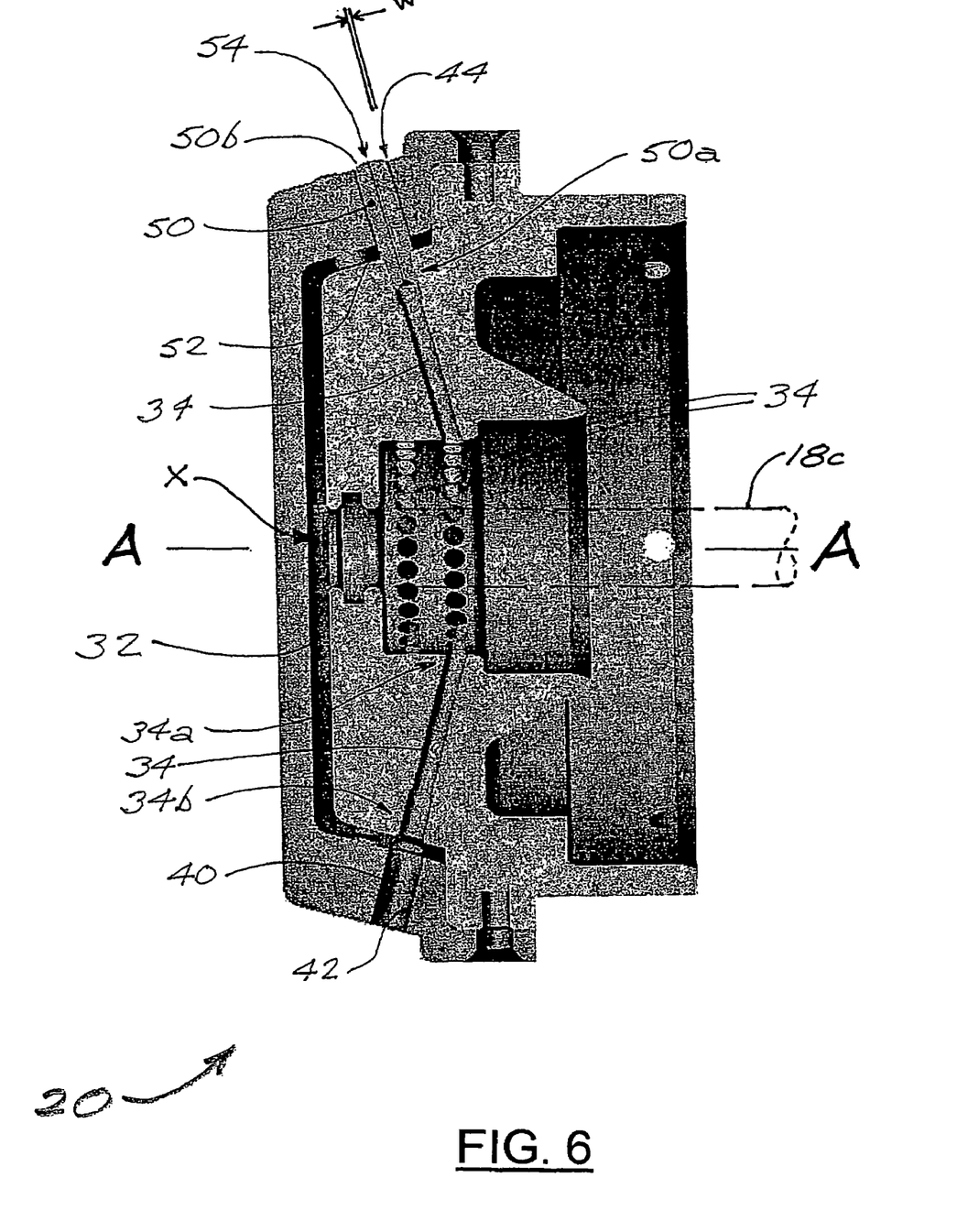
FIG. 6 is a cross-sectional view of the torch head of an embodiment of the invention in which the torch nozzles are oriented with a forward cant.

As particularly illustrated in FIGS. 5 and 6, the torch head 20 is formed so as to define a fuel plenum 30 for receiving a fuel mixture comprising a combustion gas and a primary oxidizing gas. The fuel plenum 30 may receive combustion gas and oxidizing gas conduits 18a and 18b, with these gases being combined within the fuel plenum 30, or the combustion gas and oxidizing gas may be combined in a separate mixing chamber (not shown) and then delivered to the fuel plenum 30.

In addition, the torch head 20 defines an auxiliary plenum 32, which is in fluid communication with the auxiliary oxidizing gas conduit 18c, as illustrated in FIG. 6. In the particular embodiment illustrated in FIG. 6, the auxiliary oxidizing gas conduit 18c, although not fully shown, passes through the fuel plenum 30 and discharges auxiliary oxidizing gas into the auxiliary plenum 32 at point X.

The torch head 20 also defines a plurality of fuel channels 34, each of which has an outer end 34a, plus an inner end which is in fluid communication with the fuel plenum 30. Each fuel channel 34 is in fluid communication with a corresponding nozzle port 40 formed in the torch head 20. Each nozzle port 40 intercepts the circumferential lateral surface 22 of the torch head 20 and having an inner wall surface 42 (which will typically, but not necessarily, be cylindrical). Each nozzle port 40 is adapted to receive and retain a torch nozzle 50, with clearance space between the nozzle 50 and the inner wall surface (or surfaces) 42 of the nozzle port 40. Each nozzle 50 has a side surface 52 (typically cylindrical), an inner end 50a, and an outer end 50b, plus a fuel passage extending through the nozzle 50 from inner end 50a to outer end 50b. The length of the nozzles 50 is selected such that the outer ends 50a thereof will extend close to or beyond the circumferential surface 22 of the torch head 20 when the nozzles 50 are installed in their corresponding nozzle ports 40. Accordingly, when a nozzle 50 is installed in its corresponding nozzle port 40, with its inner end 50a in sealing engagement with the corresponding fuel channel 34, a fuel mixture can flow from the fuel plenum 30 into the fuel channel 34 and into fuel passage 54 of the nozzle 50, exiting therefrom at the outer end 50b of the nozzle 50, at which point the fuel mixture may be ignited to create a torch flame.

The nozzles 50 may be of any suitable construction having central longitudinal fuel passages 54 for conveying the fuel mixture from a fuel plenum 30. In one embodiment, the nozzles 50 are conventional "MIG tips"; i.e., wire-feeder tips of a type commonly used in the metal-inert gas welding process. It has been found that acceleration of the fuel mixture as it exits the fuel passages 54 of the nozzles 50 facilitates establishment of a stable, neutral flame, by inducing a certain amount of backpressure and increasing the flame velocity. Accordingly, in one embodiment of the apparatus of the invention, the fuel passages 54 of the nozzles 50 have a narrowing or constriction near the external ends thereof, so as to accelerate the fuel mixture as it exits the nozzles 50.

The installation of a nozzle 50 into a corresponding nozzle port 40 will result in the formation of an interstitial space 44 between the side surface 52 nozzle 50 and the inner wall surface (or surfaces) 42 of the nozzle port 40. The interstitial space 44 will have an outer end 45 in proximity to the outer end 50a of the nozzle 50. The nozzle 50 will typically be of cylindrical cross-section, and as previously mentioned, the nozzle port 40 will typically have a cylindrical inner wall surface 42, so the interstitial space 44 will typically and preferably be of annular cross-section. However, this characteristic is not essential to the present invention. What is essential is that the interstitial space 44 intercepts or is otherwise in fluid communication with the auxiliary plenum 32, such that auxiliary oxidizing gas can flow from the auxiliary plenum 32 into the interstitial space 44, and will exit from the outer end 45 thereof. Regardless, though, of the dimensional characteristics of the interstitial space 44 at other points along its length, it will be preferable for the exit width W of the interstitial space 44 (i.e., at its outer end 45) to be substantially uniform, for reasons explained below.

It can be readily seen that when a fuel mixture exiting from the fuel passage 54 of the nozzle 50 has been ignited to create a torch flame, the auxiliary oxidizing gas exiting the interstitial space 44 will effectively create a curtain or shroud of auxiliary oxidizing gas substantially enveloping the torch flame. This flow of auxiliary oxidizing gas in the vicinity of the torch flame substantially increases flame velocity, intensity, and temperature. As mentioned, it is preferable for the exit width W of the interstitial space 44 to be uniform, thus promoting uniform flow of auxiliary oxygen around the flame and correspondingly uniform resultant effects on the flame.

The nozzle ports 40 may be configured such that the axes of the torch nozzles 50 intersect the longitudinal axis A of the torch head 20 (i.e., in radial fashion), and also at right angles to axis A, as may be seen in FIG. 5. It has been observed, however, that torch flame effectiveness may be enhanced by tilting the flames forward. This has the beneficial effect of increasing the temperature of portions of the liner 100 immediately ahead of the torch head 20, thus decreasing the amount of heat that needs to be transferred to the burrs and wickers when the torch flames come into direct contact with them. The tilt of the flames also induces a forward-moving pressure wave inside the liner 100 that assists in blowing debris from incinerated burrs and wickers out of the liner 100.

Figure 3:
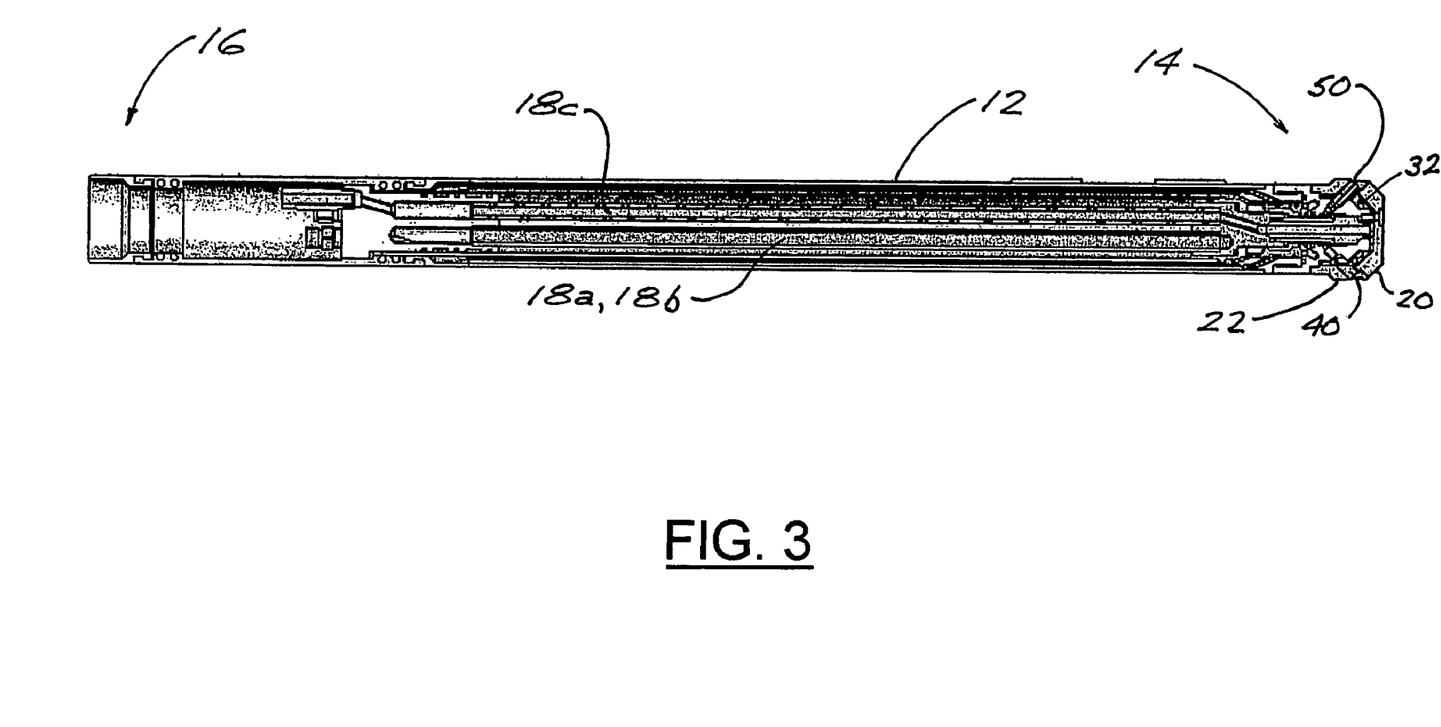
FIG. 3 is a cross-sectional side view of the torch head and torch carrier body of a second embodiment of the apparatus.
Figure 4A:
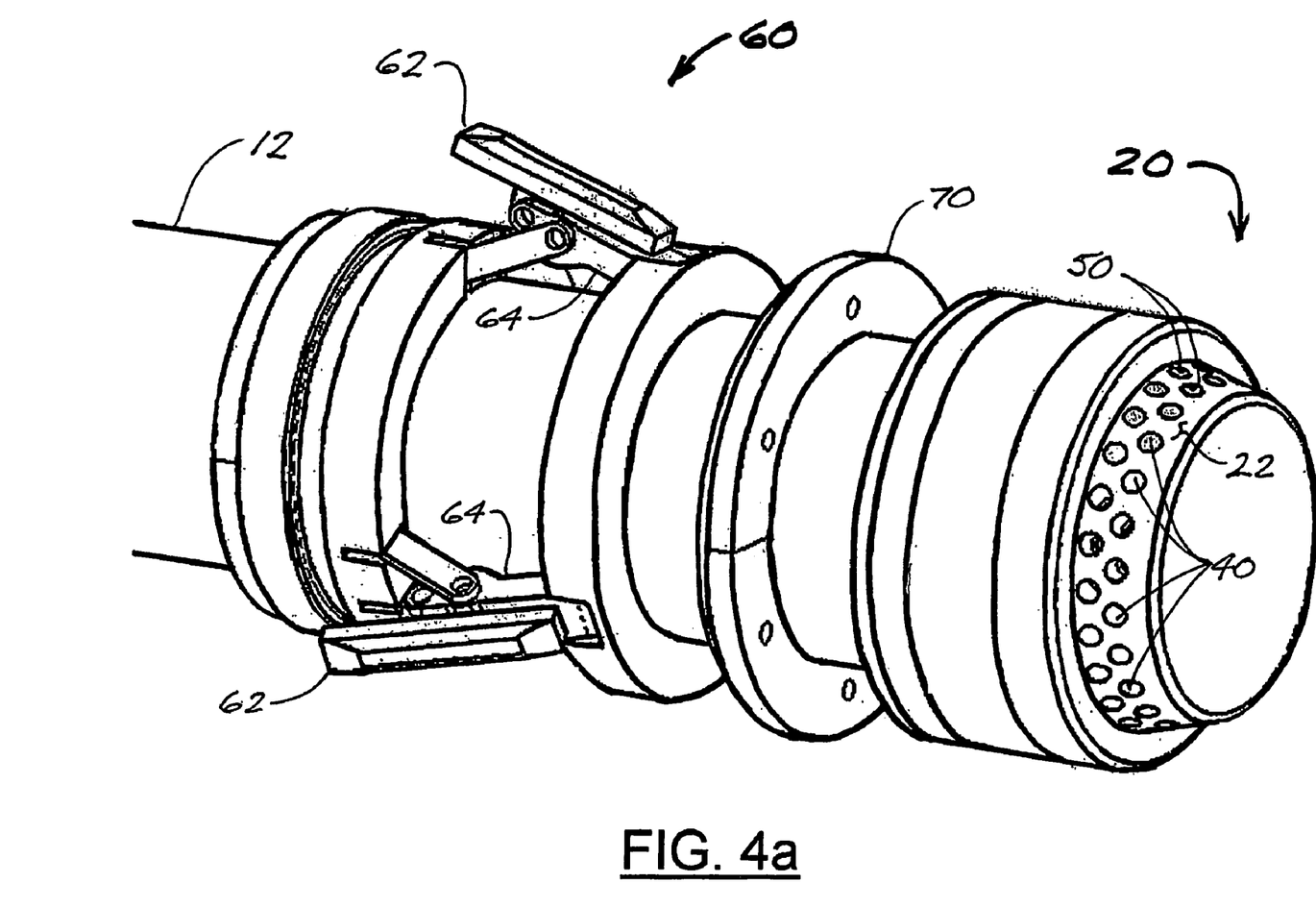
FIG. 4a is a perspective view showing the torch head, flame shield, and centralizer means of one embodiment of the apparatus.
Figure 4B:
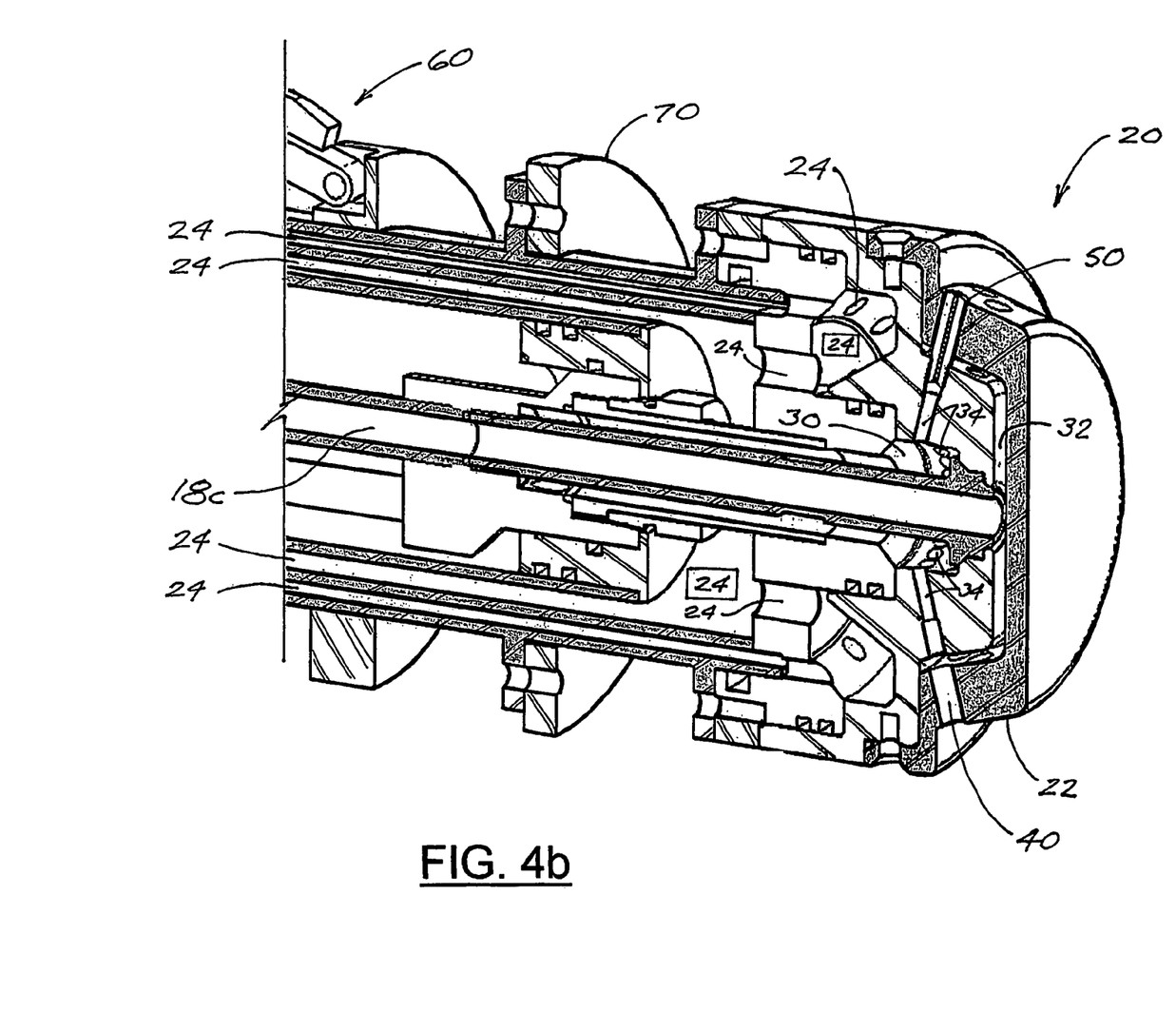

Accordingly, in the preferred embodiment of the apparatus, one or more of the torch nozzles 50 (and their corresponding nozzle ports 40) have a forward cant, so that the flames from these nozzles 50 will be directed both radially outward and toward the front of the torch head 20, as illustrated in FIGS. 3, 4b, and 6. The forward cant angle may be selected to suit particular applications. By way of example, FIGS. 4b and 6 illustrate a 15° forward cant. However, beneficial results have also been obtained using cant angles of 30°, 45°, and 60°, in torch heads 20 for use with liners having of nominal diameters of 3.5", 4.5", and 5.5" (89 mm, 114 mm, and 140 mm) respectively.

It is not essential for the torch nozzles 50 to be installed in a radial configuration relative to the longitudinal axis A of the torch head 20. In one alternative embodiment (not shown), one or more of the nozzle axes are oriented at oblique angles to axis A, such that the torch flames exit the torch head 20 in "pinwheel" fashion, thus creating a swirling effect to the flames as the torch head 20 moves through the liner 100. In a variation of this alternative embodiment, one or more nozzles 50 have a forward cant as well as an oblique orientation relative to axis A.

The combustion gas may be any combustible gas having suitable heat-producing characteristics, and acetylene is one example. However, particularly beneficial results have been observed when using a mixture of MAPP gas (i.e., methylacetylene-propadiene) and oxygen. While acetylene produces a higher flame temperature, it has been found that a MAPP gas flame is more stable than an acetylene flame. Propane or natural gas, which also produce suitably stable flames, could also be used, but their heating values are lower than for MAPP gas, making the latter more desirable to optimize burr removal rates. The fuel mixture preferably will be substantially stoichiometrically balanced, so as to produce substantially neutral-burning flames.

The auxiliary oxidizing gas may comprise air. However, particularly beneficial results have been achieved using substantially pure oxygen as the auxiliary oxidizing gas.

As previously mentioned, it has been found that when a torch head 20 in accordance with the present invention, having a suitable number of nozzles 50, is passed through a slotted liner 100 at an appropriate rate of travel, the flame intensity is sufficient to incinerate a high percentage of burrs and wickers from the interior of the liner 100, without excessive temperature rise in the parent metal. The appropriate torch head travel speed will depend on a variety of factors, including liner diameter and wall thickness, feed pressures of the fuel mixture components and the auxiliary oxygen, the number of nozzles 50 on the torch head 20, and the distance from the nozzle outlets to the inner surface of the liner 100.

As only one representative example, it has been found that a travel speed in the range of 4.0 to 4.5 feet (1.2 to 1.4 meters) per minute is effective for de-burring a nominal 7-inch diameter steel liner (i.e., 7.75" or 197 mm outer diameter; and 6.35" or 161 mm inner diameter) using a torch head 20 having 48 radially-disposed nozzles 50 burning a MAPP gas mixture fed at approximately 20 pounds per square inch (138 kiloPascals), with auxiliary oxygen fed at approximately 50 psi (345 kPa), and with the radial distance between the nozzle outlets and the inner cylindrical surface 104 of the liner 100 being approximately 0.5 inches (13 mm).

The apparatus 10 of the invention preferably includes fuel mixture control means and auxiliary oxidizing gas control means, for regulating the flowing pressure of the fuel mixture and the oxidizing gas respectively. It will be readily appreciated by persons skilled in the art that various known means for controlling or regulating the pressure of a flowing gas may be easily adapted for use as the fuel mixture control means and auxiliary oxidizing gas control means.

In the preferred embodiment, the torch head 20 will also have a flame shield 70, which may be provided in the form of a collar or flange mounted rearward of the nozzles 50 and extending radially outward from the torch head 20, but stopping just short of the inner surface 104 of the liner 100 such that it does not impede passage of the torch head 20 through the liner 100. The flame shield 70 serves two primary functions, the first of which is to shield from the flames those portions of the liner 100 which the torch head 20 has already passed by, thus further minimizing the temperature increase in the parent metal of the liner 100. The second function or effect of the flame shield 70 is to concentrate the torch flames in a region immediately adjacent to the nozzles 50, by preventing the flames from deflecting back over the region previously exposed to the flames, thus optimizing heat transfer to the burrs present inside the liner 100.

In the preferred embodiment, the apparatus 10 of the invention will include centralizer means 60, for ensuring that the longitudinal axis A of the torch head 20 is substantially aligned with the axis of the liner 100 through which the torch head 20 passes when the apparatus is in use, thus ensuring that all of the nozzles 50 are approximately equidistant from the inner surface 104 of the liner 100, so as to facilitate substantially consistent heat transfer from the nozzles 50 to the liner 100 and any burrs or wickers present at or near the inner surface 104 of the liner 100. As particularly illustrated in FIGS. 4a and 4b, the centralizer means 60 may include a plurality of rub bars 62 disposed radially about the perimeter of the torch carrier body 12, each rub bar 62 being mounted to a bracket 64 hingingly connected to the of the torch carrier body 12, and each bracket 64 having biasing means (such as a spring) for urging the rub bars 62 radially outward so as to ride against the inner surface 104 of the liner 100 as the torch head 20 passes through. Other effective centralizing means will be readily apparent to persons skilled in the art of the invention. For example, the rub bars may include (or be replaced by) rollers that will roll against the inner surface 104 of the liner 100.

Just as the liner 100 needs to be protected from excessive heat build-up, the temperature of the torch head 20 also should be kept within an acceptable range, to prevent metallurgical changes or other undesirable effects. Accordingly, in the preferred embodiment, the apparatus 10 of the invention include torch head cooling means. Although the torch head 20 may be effectively cooled using a gaseous coolant such as air, in the preferred embodiment the torch head 20 is cooled by circulation of a liquid coolant (which could comprise water or ethylene glycol) through one or more coolant circulation chambers 24 formed within the torch head 20, analogous in principle to the coolant circulation chambers in a liquid-cooled automotive engine. The coolant circulation chambers 24 for the preferred embodiment of the invention may be located and configured within the torch head 20 in any convenient fashion, in accordance with principles and methods well known in the art.

In the preferred embodiment, the torch head 20 is fabricated at least in part from steel. In an alternative embodiment, the torch head 20 is fabricated at least in part from a metal (such as titanium) that can withstand higher temperatures than steel without undesirable metallurgical or other effects, thus reducing the cooling load on the torch head cooling means, or even eliminating the need or desirability for torch head cooling means.

The torch head 20 may be fabricated in a number of sections that are subsequently assembled by bolting or other suitable means. One example of this method of fabricating and assembling the torch head 20 is illustrated in FIG. 4b; however, other arrangements may be possible. Individual sections of the torch head 20 may be machined from solid stock, or may be made as castings for machining as necessary to fashion required structural features. Casting methods may also be available which enable the entire torch head 20 to be a single casting, to be machined as necessary.

In the preferred embodiment of apparatus and method of the invention, the torch head 20 is movable through the liner 100 being de-burred. In alternative embodiments, however, the liner 100 may be moved over a stationary torch head 20. Suitable motive means for moving the torch head 20 through the liner 100, or for moving the liner 100 over a stationary torch head 20, will be readily devisable by persons skilled in the art. The motive means may include a extension member attached to the rear end 16 of the torch carrier body 12, or integral with the torch carrier body 12, and of a suitable length to facilitate insertion of the torch head 20 into the liner 100 for substantially its full length. In one embodiment of the apparatus, the motive means includes a pull rod/cable assembly connected to a hydraulic motor, for inserting the torch head 20 into the liner 100 and retracting it therefrom. Other types of motors and components may be used for the motive means without departing from the present invention.

Preferably, the motive means includes torch head speed control means for regulating the rate at which the torch head 20 travels through the liner 100. As will be appreciated by persons skilled in the art of the invention, suitable speed control means may be readily provided by use or adaptation of known technology. To provide one example, torch head speed control may be provided by use of a variable-speed motor as a component of the motive means.

It has been observed that the temperature at the outer surface of the liner 100 in the vicinity of the zone being exposed to the torch flames can be a good indicator of the flames' effectiveness in removing burrs and wickers for a given torch head speed; i.e., whether the burrs and wickers are being exposed to the flames long enough for removal. For example, in one tested assembly, a measured liner temperature of about 250° F. (121° C.) would indicate that the torch head speed was too fast, and that burr removal was less than optimally effective. This would in turn indicate that the torch head speed should be increased. At the other end of the scale, a measured liner temperature of about 350° F. (177° C.) would indicate that the torch head speed was too high. These approximate temperature limits, for purposes of monitoring flame effectiveness and for regulating torch head speed, may differ depending on various factors including the number of torch nozzles, liner dimensions, and torch flame characteristics.

In view of the foregoing observations, the preferred embodiment of the apparatus of the present invention includes means for monitoring the temperature of the parent metal of liner 100 in the general vicinity of the torch nozzles 50 as they pass through the liner 100. In a particularly preferred embodiment, the temperature-monitoring means is coupled to the motive means, using suitable known control technology, such that the torch head travel speed is automatically regulated in response to detected variations in parent metal temperature. As well as providing an indication of torch flame effectiveness as discussed above, the temperature-monitoring means may also be advantageous to alert the operator of the apparatus in the event that the parent metal temperature approaches or exceeds a selected maximum value above which undesirable effects could result, in which case appropriate remedial or preventive steps can be initiated.

When the torch head 20 is moving through the slotted liner 100 at an appropriate speed, the temperature rise in the parent metal of the liner 100 should not to temperatures high enough to cause undesirable metallurgical or other effects. However, it has been observed that the parent metal temperature tends to be higher at the crown of the liner 100 than at lower locations, and this can result in longitudinal bowing of the liner 100 as it cools down. To mitigate or prevent this undesirable condition, the preferred embodiment of the method of the invention includes the additional step of rotating the liner relative to the torch head 20, thus promoting uniform temperature rise in the parent metal around the circumference of the liner 100. As a result, the liner 100 will cool more uniformly and will therefore be less prone to longitudinal distortion. Suitable means for rotating the liner 100 will be readily apparent to persons skilled in the art, including but not limited to the use of suitably shaped rollers to cradle the liner 100, with one or more of the rollers being a drive roller that can be actuated to rotate the liner 100.

It will be readily appreciated by those skilled in the art that various modifications of the present invention may be devised without departing from the essential concept of the invention, and all such modifications are intended to be included in the scope of the claims appended hereto.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be only one such element.

The embodiments of the invention in which an exclusive property or privilege is claimed are defined as follows:

The invention claimed is:

1. A de-burring apparatus, for removing burrs from interior surfaces of a slotted metal liner, said apparatus comprising:
   (a) a torch carrier body having a front end and a rear end;
   (b) a torch head connected to the torch carrier body at the front end thereof, said torch head having a longitudinal axis and a circumferential lateral surface, said torch head having formed therewithin:
      b.1 a fuel plenum, for receiving a fuel mixture comprising a combustion gas and a primary oxidizing gas;
      b.2 an auxiliary plenum, for receiving and conveying an auxiliary oxidizing gas from a source of auxiliary oxidizing gas;
      b.3 a plurality of fuel channels, each fuel channel having an outer end and an inner end, and each fuel channel at its inner end being in fluid communication with the fuel plenum; and
      b.4 a plurality of nozzle ports, each nozzle port extending inward from the circumferential lateral surface of the torch head and having an inner wall surface, and each nozzle port being in fluid communication with a corresponding one of the fuel channels; and
   (c) a plurality of torch nozzles, each nozzle having an outer end, an inner end, and a side surface, an inner end, and each nozzle having a fuel passage extending through the nozzle between said inner and outer ends;

said apparatus being characterized by:
- (d) each nozzle being retainingly installed within a corresponding nozzle port and defining an interstitial space between the side surface of the nozzle and the inner wall surface of the nozzle port, said interstitial space having an outer end in proximity to the outer end of the nozzle;
- (e) the outer end of each nozzle extending close to or beyond the circumferential surface of the torch head;
- (f) the inner end of each nozzle being sealingly engaged with the fuel channel associated with the corresponding nozzle port, such that the outer end of the fuel passage of each nozzle is in fluid communication with the fuel plenum; and
- (g) each interstitial space being in fluid communication with the auxiliary plenum, and intercepting the circumferential surface of the torch head, such that auxiliary oxidizing gas can flow from the auxiliary plenum into the interstitial spaces and exit at the outer end thereof.

2. The de-burring apparatus of claim 1, further comprising centralizer means, for substantially aligning the longitudinal axis of the torch head with the longitudinal axis of the slotted liner.

3. The de-burring apparatus of claim 2 wherein the centralizer means comprises a plurality of rub bars disposed circumferentially around the torch carrier body, each rub bar being rotatably mounted to a bracket hingingly mounted to the torch carrier body, and each bracket having biasing means for urging the associated rub bar radially outward.

4. The de-burring apparatus of claim 1, further comprising a flame shield rearward of the nozzles.

5. The de-burring apparatus of claim 1, further comprising means for regulating the pressure of a fuel mixture flowing to the nozzles.

6. The de-burring apparatus of claim 1, further comprising means for regulating the pressure of an auxiliary oxidizing gas flowing to the interstitial spaces.

7. The de-burring apparatus of claim 1, further comprising torch head cooling means.

8. The de-burring apparatus of claim 7 wherein the torch head defines one or more coolant circulation chambers for receiving a circulating coolant fluid.

9. The de-burring apparatus of claim 1 wherein the nozzle ports are substantially uniformly spaced circumferentially around the torch head.

10. The de-burring apparatus of claim 1 wherein at least one torch nozzle is radially oriented relative to the longitudinal axis of the torch head.

11. The de-burring apparatus of claim 1 wherein at least one torch nozzle is oriented substantially perpendicularly to the longitudinal axis of the torch head.

12. The de-burring apparatus of claim 1 wherein at least one nozzle is canted toward the front end of the torch head.

13. The de-burring apparatus of claim 1 wherein at least one torch nozzle is oriented obliquely relative to the longitudinal axis of the torch head.

14. The de-burring apparatus of claim 1 wherein the fuel passage of at least one nozzle has a constriction so as to accelerate a fuel mixture exiting therefrom.

15. The de-burring apparatus of claim 1 wherein at least one torch nozzle is a MIG tip.

16. The de-burring apparatus of claim 1 wherein at least a portion of the interstitial space is of annular cross-section.

17. The de-burring apparatus of claim 1, further comprising motive means for moving the torch head relative to the slotted liner.

18. The de-burring apparatus of claim 17 wherein the motive means is adapted to hold the slotted liner longitudinally stationary and move the torch head through the slotted liner.

19. The de-burring apparatus of claim 17 wherein the motive means is adapted to hold the torch head longitudinally stationary and move the slotted liner over the torch head.

20. The de-burring apparatus of claim 17, further comprising torch head speed control means, for controlling the torch head's rate of travel relative to the slotted liner.

21. The de-burring apparatus of claim 1, further comprising temperature-monitoring means, for monitoring the temperature of the slotted liner in the vicinity of the nozzles.

22. The de-burring apparatus of claim 20, further comprising temperature-monitoring means, for monitoring the temperature of the slotted liner in the vicinity of the nozzles, and wherein the torch head speed control means is adapted to adjust the torch head speed according to variations in liner temperature as measured by the temperature-monitoring means.

23. A method of removing burrs from interior surfaces of a slotted metal liner, said method comprising the steps of:
- (a) providing a torch head having one or more torch nozzles;
- (b) delivering a fuel mixture comprising a combustion gas and a primary oxidizing gas to the one or more torch nozzles;
- (c) igniting the fuel mixture exiting the one or more torch nozzles, thus creating one or more torch flames;
- (d) introducing an auxiliary oxidizing gas in the immediate vicinity of each torch flame so as to raise the flame temperature to a level sufficient to substantially incinerate metal burrs present on the interior surface of the slotted liner; and
- (e) passing the torch head through the slotted liner at an appropriate speed such that the torch flames are directed toward the interior surface of the slotted liner so as to substantially incinerate the metal burrs, while simultaneously rotating the liner relative to the torch head.

24. A method of removing burrs from interior surfaces of a slotted metal liner, said method comprising the steps of:
- (a) introducing a fuel mixture comprising a combustion gas and a primary oxidizing gas into the fuel plenum of the torch head of a de-burring apparatus according to claim 1, such that the fuel mixture flows into the fuel passages of the torch nozzles of the torch head;
- (b) igniting the fuel mixture exiting the fuel passages of the torch nozzles to create torch flames;
- (c) introducing an auxiliary oxidizing gas into the auxiliary plenum of the torch head, such that the auxiliary oxidizing gas flows out of the interstitial spaces around the torch nozzles;
- (d) regulating the respective flowing pressures of the fuel mixture and auxiliary oxidizing gas so that the torch flames are of a temperature sufficient to substantially incinerate metal burrs present on the interior surface of the slotted liner; and
- (e) passing the torch head through the slotted liner at an appropriate speed such that the torch flames are directed toward the interior surface of the slotted liner so as to substantially incinerate the metal burrs.

25. The de-burring method of claim 24 wherein the step of passing the torch head through the slotted liner is effected by holding the liner longitudinally stationary and moving the torch head through the liner.

26. The de-burring method of claim 24 wherein the step of passing the torch head through the slotted liner is effected by holding the torch head stationary and passing the liner over the torch head.

27. The de-burring method of claim 24 further comprising the step of rotating the liner relative to the torch head.

28. The de-burring method of claim 24 wherein the torch head defines one or more coolant circulation chambers, and further comprising the step of circulating a coolant fluid through the coolant circulation chambers.

29. The de-burring method of claim 28 wherein the coolant fluid is a liquid coolant.

30. The de-burring method of claim 29 wherein the liquid coolant comprises water.

31. The de-burring method of claim 29 wherein the liquid coolant comprises ethylene glycol.

32. The de-burring method of claim 28 wherein the coolant fluid comprises a coolant gas.

33. The de-burring method of claim 32 wherein the coolant gas comprises air.

34. The de-burring method of claim 24 wherein the combustion gas is selected from the group consisting of MAPP gas, acetylene, propane, and natural gas.

35. The de-burring method of claim 24 wherein the fuel mixture is substantially stoichiometrically balanced.

36. The de-burring method of claim 24 wherein the primary oxidizing gas comprises substantially pure oxygen.

37. The de-burring method of claim 24 wherein the auxiliary oxidizing gas comprises substantially pure oxygen.

38. The de-burring method of claim 24 wherein the auxiliary oxidizing gas comprises air.

* * * * *